(12) United States Patent
Bellomare et al.

(10) Patent No.: US 11,864,564 B2
(45) Date of Patent: Jan. 9, 2024

(54) MIXING DEVICE

(71) Applicant: DE' LONGHI APPLIANCES S.R.L. CON UNICO SOCIO, Treviso (IT)

(72) Inventors: Filippo Bellomare, Treviso (IT); Alessandro Benedetti, Treviso (IT); Andrea Moro, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 614 days.

(21) Appl. No.: 17/252,720

(22) PCT Filed: Jun. 14, 2019

(86) PCT No.: PCT/IT2019/050139
§ 371 (c)(1),
(2) Date: Dec. 15, 2020

(87) PCT Pub. No.: WO2019/239442
PCT Pub. Date: Dec. 19, 2019

(65) Prior Publication Data
US 2021/0112825 A1      Apr. 22, 2021

(30) Foreign Application Priority Data

Jun. 15, 2018   (IT) .................. 102018000006375

(51) Int. Cl.
| | |
|---|---|
| *A23G 9/00* | (2006.01) |
| *A23G 9/22* | (2006.01) |
| *A23G 9/12* | (2006.01) |
| *A47J 43/07* | (2006.01) |

(Continued)

(52) U.S. Cl.
CPC ............... *A23G 9/224* (2013.01); *A23G 9/12* (2013.01); *A47J 43/0711* (2013.01); *B01F 27/13* (2022.01); *B01F 2101/13* (2022.01)

(58) Field of Classification Search
CPC . A23G 9/224; A23G 9/12; B01F 27/13; A47J 43/0711
See application file for complete search history.

(56) References Cited

U.S. PATENT DOCUMENTS

| | | | |
|---|---|---|---|
| 2,840,358 | A  | 6/1958 | Artino |
| 2003/0161924 | A1 | 8/2003 | Cigolini |

(Continued)

FOREIGN PATENT DOCUMENTS

| | | |
|---|---|---|
| DE | 15 01 194 A1 | 2/1970 |
| EP | 0 596 221 A1 | 5/1994 |
| EP | 3 195 924 A1 | 7/2017 |

(Continued)

OTHER PUBLICATIONS

International Search Report and Written Opinion for PCT/IT2019/050139, dated Sep. 23, 2019.

*Primary Examiner* — Anshu Bhatia
(74) *Attorney, Agent, or Firm* — MARSHALL, GERSTEIN & BORUN LLP

(57) ABSTRACT

A mixing device suitable to mix substances or liquid or semi-liquid mixtures to increase the volume thereof, includes a hub which develops along a central axis and two mixing spokes connected to the hub, wherein each of the spokes includes an external lateral fin and two upper and lower connection segments, which connect respective upper and lower ends of the lateral fin to the hub.

14 Claims, 3 Drawing Sheets

(51) Int. Cl.
  *B01F 27/13*   (2022.01)
  *B01F 101/13*  (2022.01)

(56) References Cited

U.S. PATENT DOCUMENTS

2007/0140053 A1* 6/2007 Jejcic .................... B01F 27/091
                                                     366/311
2011/0211419 A1* 9/2011 Anderson ......... B01F 33/50115
                                                      366/64

FOREIGN PATENT DOCUMENTS

| | | |
|---|---|---|
| FR | 2 216 011 A1 | 8/1974 |
| FR | 2 218 133 A1 | 9/1974 |
| FR | 2 899 767 A1 | 10/2007 |
| WO | WO-2017/013155 A1 | 1/2017 |

* cited by examiner

MIXING DEVICE

FIELD OF THE INVENTION

The present invention concerns a mixing device, advantageously, although not exclusively, intended for preparing and whisking ice cream, being suitable to volumize liquid or semi-liquid substances, for example milk, eggs, and suchlike, by introducing into the substance as much air as possible so as to increase its volume and obtain a mixture with a homogeneous and creamy consistency.

BACKGROUND OF THE INVENTION

Equipment is known which is provided with whisk mixing devices and/or machines provided with a container with an internal rotating mixing device for beating liquid or semi-liquid mixtures such as for example milk and/or eggs.

Mixing devices are also known associable with machines to produce and/or whisk ice cream, configured to mix the mixture while it is cooled with a suitable cooling circuit, to incorporate air inside it and increase its volume.

The conformation of known mixing devices is normally whip-like, or helicoidal, or with a flat extension, that is, extending three-dimensionally, and have a drive shaft cooperating with a motor member.

Mixing devices with one or more spokes, or mixing blades, are also known, and different types of spokes, or mixing blades, are also known.

During the ice-cream production process it is a disadvantage that the mixture often remains on the walls of the container without being properly mixed.

If the mixture is not removed from the walls of the container regularly, and with continuity, the part in contact with the cooled surface of the latter tends to freeze, giving as a result a non-homogeneous and not very creamy mixture.

Another disadvantage is that the mixture is not sufficiently volumized.

In fact, it is desirable to considerably increase the volume of the initial mixture, also defined in the field as "overrun", which on the one hand confers a high degree of softness and creaminess to the ice cream, and on the other increases the yield of the raw materials, increasing the overall profit.

In the state of the art, solutions are known which have tried at least in part to solve the problems indicated above.

From FR-A-2.218.133 a mixing device is known comprising a central hub and three spokes angled with respect to the central hub and disposed in a helical shape around it in a substantially cylindrical area. The mixing device described also comprises a plurality of suction cups, disposed aligned along each spoke, which, during use, are compressed against the internal surface of a cooling tub, adhering to it to remove the layer of mixture which deposits on the surface.

Other examples of mixing devices with three spokes, suitable to be used in association with cylindrical containers are known from US-A_2003/0161924, DE-A-15 01 194, FR-A-2 216 011, EP-A-0 596 221, EP-3 195 924 and FR-A-2 899 767.

The solutions described in the documents above do not allow to obtain an optimal contact of the mixture with the cooled walls, and therefore an effective heat exchange with the evaporator, also taking into account the cylindrical shape of the container in which they are disposed and with which they cooperate during use.

Document WO-A-2017/013155 describes a device to prepare food ingredients, comprising a pair of blades to break and chop the ingredients so as to extract their liquid and the aromas, and at least one inclined wing suitable to direct the foods toward the blade. This device, in addition to not being suitable to incorporate air into the ingredients to make them soft, as required in the preparation of ice cream, is in any case designed to cooperate with a cylindrical container.

Document U.S. Pat. No. 2,840,358 A describes a rotating mixing device for viscous or semi-solid materials suitable to counteract the viscosity that the materials exert on the discs of the impeller.

One purpose of the present invention is to provide a mixing device which allows to obtain an efficient and effective removal of the mixture from the walls of a container.

Another purpose is to provide a mixing device which allows to obtain a large increase in the volume of the mixture, and therefore a high overrun.

Another purpose is to provide a mixing device which allows to mix the mixture homogeneously and uniformly, avoiding the formation of ice crystals which are too large, and obtain a smooth and soft final product.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

The present invention concerns a mixing device, or mixing blade, suitable to beat liquid, semi-liquid and doughy substances, to increase the volume thereof.

The mixing device according to the invention is particularly suitable to be used to produce ice cream, to beat liquid or semi-liquid substances, such as for example milk, eggs and possibly other ingredients, and whisk the obtained mixture, to obtain an ice cream with a homogeneous and creamy consistency.

The mixing device can also be applied to a shaft blender and inserted into any container.

Furthermore, the mixing device can also be used in a machine to prepare ice-cream comprising a container in which to dispose the ingredients, a cooling circuit to cool the container, a motor member to rotate the mixing device around its central axis, and a structure to support and position the whole.

The ice cream machine can preferably be a domestic, or semi-professional, machine.

The mixing device is conventionally connectable to a drive shaft of the motor to be rotated around a central axis.

The present invention also concerns both mixing devices which are associated with at least a part of the drive shaft, and also mixing devices which are detachable from the drive shaft in any way (screwing, joint, mixed connection, etc.).

According to the invention, the mixing device comprises a central hub and three mixing spokes connected to the hub.

It is a preferred and advantageous solution of the present invention that the mixing device comprises only two spokes, disposed offset by 180° with respect to the central axis defined by the hub, without other intermediate spokes between the two.

The presence of only two mixing spokes allows to reduce the quantity of material that tends to accumulate on them, allowing an effective mixing and to obtain a creamy and homogeneous product even when preparing small quantities of ice cream. Furthermore, this solution allows to reduce the resistance generated by the mixture to be mixed, allowing to increase the rotation speed of the mixing device and to effectively incorporate air into the mixture so as to increase its volume and therefore its creaminess.

According to some embodiments, at least one of the mixing spokes lies at least in part on a first lying plane skewed, that is, inclined with respect to the central axis; that is, a first lying plane that does not contain the central axis.

According to some embodiments, the position of said first lying plane can be right-hand or left-hand.

According to a further variant of the invention, one spoke of the mixing blade can have a skewed positioning in one direction and/or in the other, and the other have a lying plane coherent with the central axis.

The spokes of the blade can lie, if they are both skewed, on different planes defined by different angles of inclination with respect to the axis of rotation.

According to some embodiments, each spoke comprises an external lateral fin and two connection segments, upper and lower, which connect the respective upper and lower ends of the lateral fin to the hub. Said external lateral fins have a substantially vertical development, or slightly inclined with respect to the vertical, while the connection segments have a substantially horizontal development, or slightly inclined with respect to the horizontal.

With this configuration, the two spokes substantially form a hollow quadrilateral with an irregular shape, along the center line of which the central axis of rotation extends.

In one embodiment, the lateral fins and the respective upper connection segments lie on skewed, that is, inclined planes, one with respect to the other and/or with respect to the central axis.

The angle between the respective connection segments, upper and lower, determines a helical shape of the spokes.

According to some embodiments, the spokes develop, with respect to the central axis, in a truncated cone-shaped volume, and the respective external edges of the lateral fins lie on a common truncated cone-shaped surface.

The truncated cone-shaped surface is flared between the lower connection segment and the upper connection segment.

According to some embodiments, the truncated cone-shaped surface can have a flaring angle comprised between 1 and 15° with respect to the central axis.

According to some embodiments, this conformation makes the use of the mixing device according to the invention suited to ice cream machines with truncated cone-shaped containers, which allow better contact and therefore heat exchange with evaporators with a mating truncated cone shape.

Furthermore, the device according to the invention is particularly suitable in the case of machines for preparing ice cream with a substantially horizontal axis of rotation, as the truncated-cone geometry of the spokes allows to obtain a complete and easy extraction of the mixture at the end of the preparation.

According to some embodiments, one or more lateral fins lie on respective vertical lying planes inclined with respect to the central axis of the mixing device by an angle of vertical inclination comprised between 2° and 10°.

Providing a small angle of vertical inclination allows to maintain the mixture in greater contact with the cooling wall and therefore to reduce the freezing time of the ice cream in contact with the wall, in this way reducing the cycle times for the transformation of the mixture into ice cream. This is particularly effective when the mixing device is used in a machine to produce ice cream with a substantially horizontal axis of rotation, that is, not very inclined with respect to the horizontal, for example by an angle not greater than 20°. This conformation also allows to modify the direction of rotation of the mixing device, and therefore of the spokes, without destructing the mixed mixture, making the mixing device suitable to also be used to produce products other than ice cream, such as for example sorbets.

Furthermore, the possibility of changing the direction of rotation of the mixing device without ruining the mixture allows to easily unblock the mixing device in the event that it blocks, for example due to excessive cooling of the cooled walls, and therefore excessive freezing of the mixture inside it.

According to the invention, the spokes have a through aperture delimited by the connection segments, the lateral fin and the hub, through which, during use, the mixture to be mixed can pass.

The upper and/or lower segments of the spokes, according to the invention, can be both orthogonal with respect to the central axis and also have, one and/or the other of the segments, a positive or negative angle.

According to one variant, the connection segments are present only around one end of the external lateral fin of the mixing device, for example the upper or lower end, the end of the fin in which the connecting segment is not present being able to be connected to the central hub by a connection element.

According to a further variant, at least one of the connection segments is positioned in an intermediate position with respect to the corresponding lateral fin, reinforcement connectors being possibly provided which connect the upper and/or lower ends of the lateral fin to the central hub.

According to some embodiments, the upper and lower connection segments of one spoke are angled with respect to each other by an angle of horizontal inclination comprised between about 10° and about 25° with respect to the central axis.

Therefore, the upper and lower end parts of the fins, that is, the upper and lower connection segments, can have, with respect to the radial axis, a respective angle, equal or different with respect to the angle of the other parts.

According to some embodiments, the lower connection segment extends substantially in a radial direction with respect to the axis of rotation, and the upper connection segment extends angled with respect thereto.

According to some embodiments, at least one spoke is provided with grooves and/or extensions made in an external edge of the lateral fin, configured to promote the generation of bubbles with small sizes, and incorporate as much air as possible into the mixture, so as to increase the volume and therefore the overrun of the mixture itself and make it creamy.

According to further embodiments, at least one spoke is provided with further grooves and/or extensions made in an internal edge of the lateral fin, which are configured to cooperate with the grooves and/or extensions made in the external edge of the lateral fin in order to volumize the substances more, and more effectively in the mixing step.

According to some embodiments, the spokes are provided with grooves in reciprocally offset positions to facilitate the formation of air bubbles with small sizes, and at the same time allow the removal of the mixture from the walls of the tub or container.

Advantageously, the grooves are located offset with respect to each other along the longitudinal development of the respective lateral fins, so that they follow autonomous circumferential paths.

According to some embodiments, the grooves and/or the extensions provided on the external and/or the internal edge of the lateral fin define corners with squared angles, that is, not rounded.

According to some embodiments, the extensions can have a pyramid shape and/or a rectangular or square shape, that is, similar or comparable.

In the case of a pyramid-shaped extension, each pyramid achieves an external corner and possibly two corners at the base.

In the case of rectangular or square extensions, they achieve two external corners and possibly two corners at the base.

According to variant embodiments, the upper and lower connection segments of one or of each spoke can be angled with respect to the corresponding lateral fin, defining between them respective included angles. This conformation allows to confer discontinuity to the mass of the mixture to be mixed, preventing it from stratifying on the spoke, thus allowing to obtain a more homogeneous and uniform mixture.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
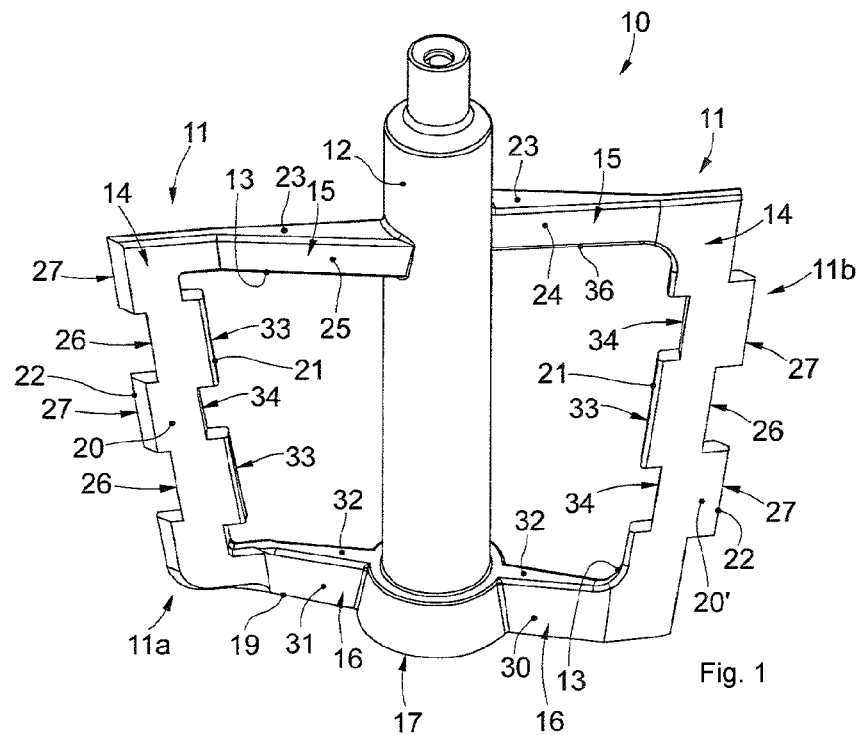
FIG. 1 shows a three-dimensional view of an example form of a mixing device according to an embodiment described here.
Figure 2:
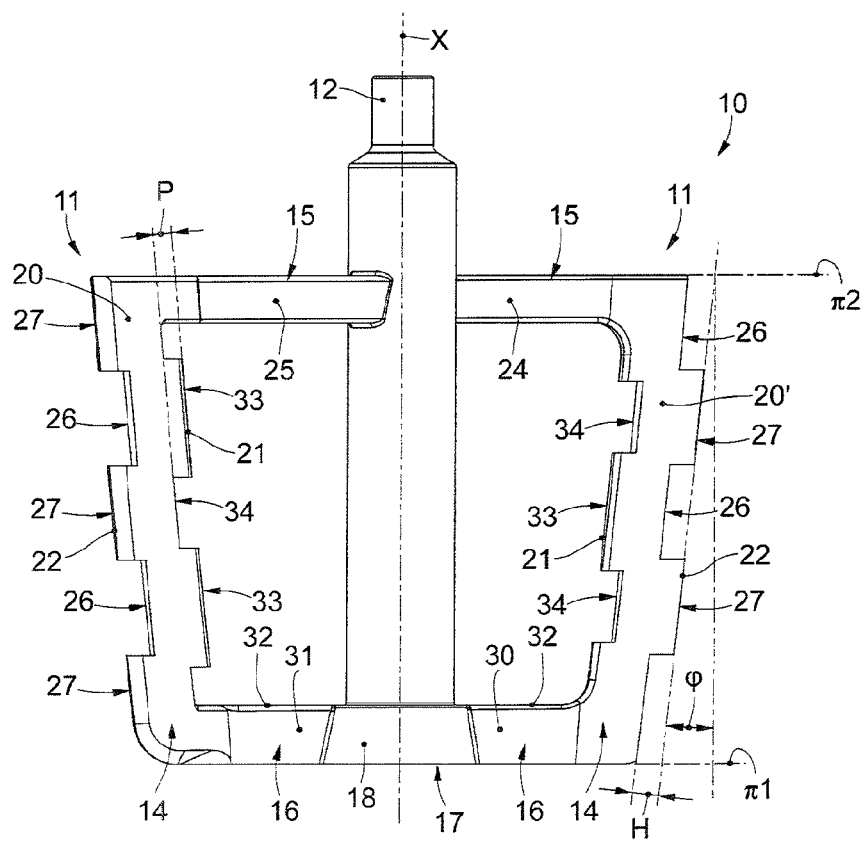
FIG. 2 shows a view from one side of the mixing device of FIG. 1.
Figure 4:
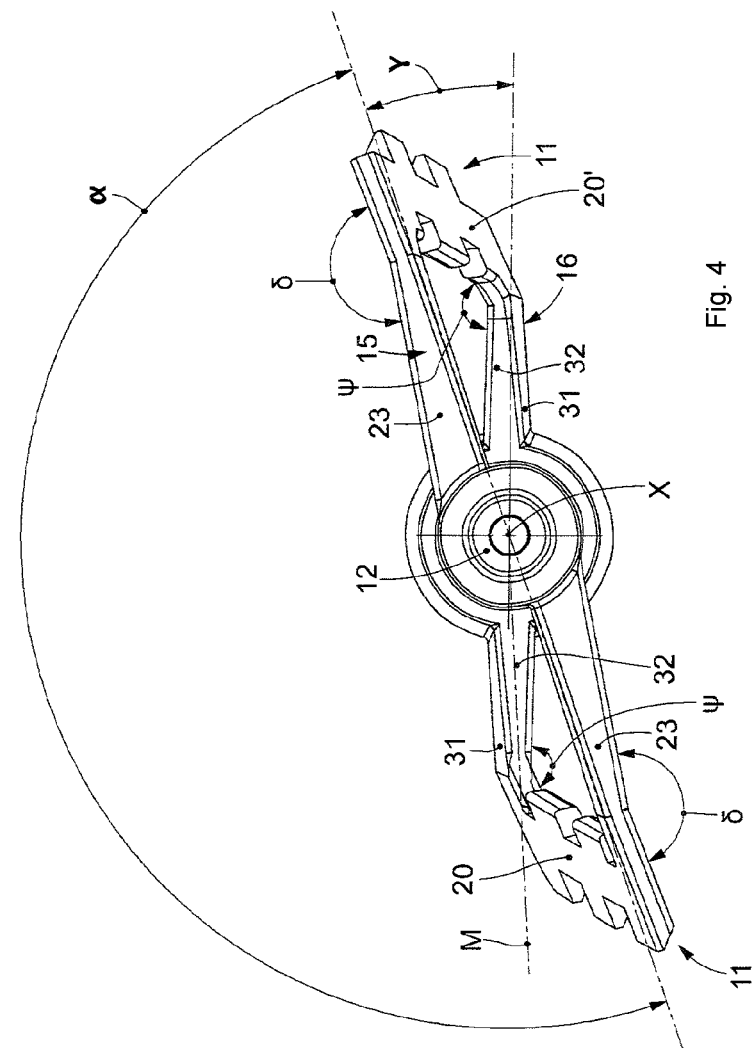
FIG. 4 shows a view from above of the mixing device according to embodiments described here.
Figure 3:
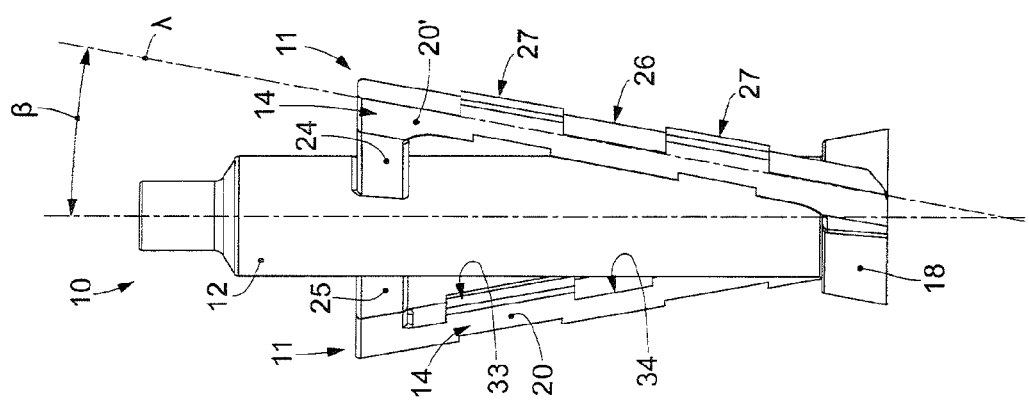
FIG. 3 shows a lateral view from a different side of the mixing device of FIGS. 1 and 2.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Embodiments described here with reference to the attached drawings concern a mixing device, or mixing blade 10, of the type suitable to be used to mix liquid or semi-liquid substances, or mixtures, and to incorporate air therein to increase their volume.

The mixing device 10 is, in particular, suitable to be applied in an ice cream machine (not shown) provided with a container, or tub, inside which the ingredients to be mixed are located, and a cooling circuit suitable to cool the walls of the container, and therefore the substances or mixtures in contact therewith.

According to some embodiments, the mixing device 10 comprises two mixing spokes, or blades, 11a, 11b, also indicated as a whole with the reference number 11.

The mixing device 10 comprises a hub 12 configured to be connected to a drive shaft of a motor member and to be rotated by the latter around a central axis X.

According to some embodiments, the spokes 11 are connected to and extend from the hub 12.

According to some embodiments, the mixing device 10 consists of the hub 12 and two spokes 11, which are made in a single body.

According to some embodiments, the two spokes 11 are disposed diametrically distanced with respect to the central axis X, that is, they are disposed at an angle α of 180° with respect to each other.

The drawings do not show either the container inside which the mixing device 10 operates during use, or the motor member which rotates the hub 12 of the mixing device 10 around the central axis X.

According to some embodiments, the mixing device 10 is detachable from the drive shaft and removable from the container for hygiene reasons, so as to allow an adequate cleaning thereof.

According to some embodiments, the hub 12 is hollow and has a tubular shape provided with at least a first aperture 17 through which a drive shaft can pass by means of which the same hub 12 can be made to rotate.

According to some embodiments, the hub 12 comprises a base portion 18 with a diameter greater than the mean diameter of the hub 12, suitable to be put in contact with the bottom of a tub, or container for the ingredients, so as to prevent the mixture from accumulating in the central portion, and therefore not being mixed in a suitable manner.

According to some embodiments, the mixing spokes 11 comprise an external lateral fin 14, and two connection segments, an upper connection segment 15 and a lower connection segment 16, which connect respective upper and lower ends of the lateral fin 14 to the hub 12.

According to some embodiments, each mixing spoke 11 defines a substantially quadrangular through aperture 13, delimited by the connection segments 15, 16, by the external lateral fin 14 and by the hub 12, through which the mixture to be mixed can pass.

According to other embodiments, the through aperture 13 can take any shape desired.

According to some embodiments, the lateral fins 14 and the respective upper 15 and lower 16 connection segments develop along respective axes of longitudinal development that are skewed, that is, inclined with respect to each other and/or with respect to the central axis X.

According to some embodiments, the mixing spokes 11 are C-shaped.

The angle between the respective upper 15 and lower 16 connection segments determines a helical shape of the spokes 11.

Furthermore, according to some embodiments, the external edges 22 of the lateral segments can be inclined toward the outside and upward to adapt to a truncated cone-shaped container.

According to some embodiments, the spokes 11 are configured so that the respective external edges 22 of the lateral fins 14 lie on a truncated cone-shaped surface, flared toward the upper connection segment 15.

This conformation of the lateral fins 14, with the respective edges inclined toward the outside, makes them suitable to adapt to a container with a truncated cone shape.

The inclination of the external edges 22 can be correlated to the inclination and to the flaring of the lateral walls of the container with which they have to cooperate during use, so that the spokes 11 can efficiently remove the mixture from the lateral walls.

According to some embodiments, the truncated cone-shaped surface can have a flaring angle comprised between 1 and 15° with respect to the central axis.

By way of example, the external edge 22 of one, or each spoke 11 can be inclined by a flaring angle $\varphi$ for example comprised between 0° and 15°, preferably between 5° and 10° with respect to the central axis X.

According to some embodiments, the lower connection segments 16 are connected to the hub 12 in correspondence with the base portion 18.

According to some embodiments, the lower connection segments 16 of the two spokes 11 have respective flat lower surfaces 19 which are made in continuity with the lower surface of the base portion 18 and all lie on a first common lying plane $\pi 1$.

According to some embodiments, the lower connection segments 16 have a first 30 and a second 31 side which extend in a direction transverse to the flat lower surface 19, and an upper surface 32 which partly delimits the through aperture 13.

In this way, during use, the lower connection segments 16 can remove the mixture that accumulates in correspondence with a bottom wall of the container, allowing a more effective mixing which confers greater homogeneity to the final mixture.

According to some embodiments, the upper connection segments 15 can be connected to the hub 12 in correspondence with an upper portion thereof.

By way of example, the upper connection segments 15 can be connected to the hub 12 in a position comprised between about ⅔ and about ¾ of its overall length with respect to the first lying plane $\pi 1$ of the base portion 18 and of the flat lower surfaces 19.

In this way, the upper connection segments 15 also contribute to the mixing of the mixture and of the substances, increasing the overall efficiency of the mixing device 10.

According to further embodiments, the upper connection segments can be connected to the hub 12 in correspondence with its upper end opposite the base portion 18, and be configured to remove the mixture in correspondence with a lid to close the container in which the mixing device 10 is inserted and enclosed.

According to some embodiments, at least one mixing spoke 11 is skewed with respect to the central axis X, that is, it lies at least in part on a lying plane which does not include the central axis X.

According to some embodiments, at least one mixing spoke 11 has at least one angle of vertical inclination $\beta$ and at least one angle of horizontal inclination $\gamma$.

According to some embodiments, the two mixing spokes 11 have a geometry of substantially the same shape and all have the same angles of vertical $\beta$ and horizontal $\gamma$ inclination.

According to possible variants, one spoke 11 can have an angle of vertical $\beta$ and/or horizontal $\gamma$ inclination different from the other spoke 11.

According to some embodiments, the lateral fins 14 lie on a first vertical lying plane $\lambda$ skewed with respect to the central axis X.

According to some embodiments, the first vertical lying plane $\lambda$ is inclined with respect to the axis of rotation by an angle of vertical inclination $\beta$ comprised between 2° and 10°.

According to other embodiments, the angle of vertical inclination $\beta$ can be comprised between 4° and 8°.

The smaller the angle of vertical inclination $\beta$, the greater the action performed by the lateral fins 14, during use, to keep the mixture in contact with the cooled walls of the container, acting substantially as a spatula, so as to increase the heat exchange between the mixture and the cooled wall of the container and consequently reduce the preparation time of the ice cream.

According to embodiments described with reference to the attached drawings, the angles of vertical inclination $\beta$ are right-hand.

According to possible variants, not shown, the angles of vertical inclination $\beta$ are left-hand.

The reduced angles of vertical inclination $\beta$ also allow to invert the direction of rotation of the mixing device 10 without destructuring or damaging the mixture being worked.

According to some embodiments, the lateral fins 14 have respectively an internal edge 21 which delimits the through aperture, an external edge 22, opposite the internal edge 21 and suitable to cooperate, during use, at least partially, with the lateral surface of a container, or tub, for the substances or with the mixture to be mixed, and two lateral surfaces 20, 20' which connect the two edges 21, 22 to each other.

According to some embodiments, the vertical lying plane A can be the plane on which at least one lateral surface 20, 20' lies.

According to further embodiments, the lateral surfaces 20, 20' lie on respective first vertical lying planes A parallel to each other.

According to some embodiments, the external lateral fins 14 have a substantially uniform thickness along a longitudinal development thereof.

According to variant embodiments, the lateral fins 14 can have an external lateral portion with a thickness decreasing toward the external edge 22.

According to some embodiments, the lower connection segments 16 have a tapered shape with a thickness decreasing from the hub 12 toward the respective lateral fin 14.

According to some embodiments, the lower connection segments 16 in a plan view from above can have a shape substantially symmetrical with respect to a median axis M.

According to some embodiments, the median axis M extends in a substantially radial direction with respect to the central axis X, that is, substantially orthogonal thereto.

According to some embodiments, the upper connection segments 15 have a tapered shape between the hub 12 and the lateral fin 14.

According to some embodiments, the upper connection segments 15 have a first side 24 disposed substantially in a radial direction to the central axis X, and a second side 25, opposite the first side 24, and disposed inclined with respect thereto, joined together by respective upper 23 and lower 36 surfaces.

The second side 25 can be disposed, for example, substantially tangent to an external surface of the hub 12.

According to some embodiments, the upper surfaces 23 of all two spokes 11 lie on a second common lying plane π2.

According to some embodiments, the first and second lying planes π1, π2 are parallel to each other.

According to some embodiments, the upper 15 and lower 16 connection segments of a same spoke 11 are angled with respect to each other by the angle of horizontal inclination γ.

According to some embodiments, the angle of horizontal inclination γ can be correlated to, and vary as a function of, the amplitude of the angle of vertical inclination β and the longitudinal length of the lateral fin 14.

For example, the angle of horizontal inclination γ can be measured on a plane orthogonal to the central axis X as the angle included between the median line M of the lower connection segment 16 and the first side 24 of the upper connection segment 15, both substantially radial with respect to the central axis X.

According to some embodiments, the angle of horizontal inclination γ is comprised between about 15° and about 25°.

According to variant embodiments, the angle of horizontal inclination γ is comprised between about 18° and about 22°.

According to another variant, the angle of horizontal inclination γ is about 20°.

According to some embodiments, the upper connection segment 15 is offset in a counterclockwise direction by an angle of horizontal inclination γ with respect to the lower connection segment 16.

According to a further embodiment, the upper connection segment 15 can be offset in a clockwise direction by the angle of horizontal inclination γ with respect to the lower connection segment 16.

According to this solution, during the rotation of the mixing device 10 around the central axis X in a counterclockwise direction, the lower connection segment 16 follows the upper connection segment 15.

According to variant embodiments, one or more of the upper connection segments 15 and/or the lower connection segments 16 can be angled with respect to the respective lateral fin 14, defining with respect to each other respective included angles δ, ψ equal to, or different from each other.

By way of example, the included angles δ, ψ can vary between 150° and 180°.

According to some embodiments, the included angles δ, ψ can vary between 155° and 175°.

The included angles δ, ψ between the fins 14 and the respective connection segments 15, 16 allow to confer discontinuity to the mass of the mixture to be mixed, preventing it from becoming stratified on the spoke 11, so as to obtain a more homogeneous and uniform mixture.

According to some embodiments, the upper included angle δ between the second side 25 of the upper connection segment 15 and the adjacent lateral surface 20 of the respective lateral fin 14 is greater than the lower included angle ψ between the second side 31 of the lower connection segment 16 and the same lateral surface 20 of the lateral fin 14; for example, the difference between the two angles above can be correlated to the amplitude of the angle of vertical inclination β.

According to some embodiments, at least one spoke 11 is provided with grooves 26 made in correspondence with the external edge 22 of the lateral fin 14 and configured to promote the generation of air bubbles with small sizes, which can be incorporated into the mixture during the mixing process.

According to further embodiments, at least one spoke 11 is provided with further grooves 34, made in an internal edge 21 of the lateral fin 14, configured to cooperate with the grooves 26 made in the external edge 22 of the lateral fin 14 in order to volumize the substances more, and more effectively The grooves 26, 34 allow to incorporate as much air as possible into the mixture to increase its volume.

The grooves 26 are separated by protruding portions, or extensions 27, the ends of which define the portions of the external edge 22 configured to cooperate, during use, with the walls of a container, or tub.

The grooves 34 are made starting from the internal edge 21 so as to define protruding extensions 33 also in the internal edge 21 of the lateral fin 14.

The protruding extensions 27 are made in correspondence with the grooves 34 so as to lighten the structure of the lateral fin 14 and at the same time maintain its mechanical characteristics unaltered. This configuration allows a greater effectiveness of the mixing device 10, making the mixture more amalgamated, creamy, light and fluffy.

According to some embodiments, the protruding extensions 27 can have a height H equal to the depth P of the grooves 34.

According to some embodiments, the protruding extensions 27, 33 can have a constant thickness.

According to variant embodiments, the protruding extensions 27, 33 can have a decreasing thickness respectively toward the external 22 and internal 21 edge.

According to further variant embodiments, the lateral surface of the external edge 22 can be oblique with respect to the first lying plane of the lateral fin 14, so as to facilitate the removal of the mixture from the walls of the container, or tub.

The cooperation of the grooves 26/extensions 27 with the walls of a container, or tub, determines the formation of passage channels 28 which, during the rotation of the mixing device, determine the generation of the air bubbles.

According to some embodiments, the grooves 26 and the extensions 27 define corners 29 of the passage channels 28, while the grooves 34 and the extensions 33 define corners 35.

In a first solution, the corners 29 and/or the corners 35 are square so as to create discontinuities suitable to generate bubbles of small sizes, which, when mixed with the mixture, increase its volume, allowing to obtain a soft and creamy final product.

Providing grooves 26, 34 and extensions 27, 33 both on the external edges 22 and also on the internal edges 21 of the spokes 11 allows to further increase the volume of the final mixture.

According to possible variants, at least some of the corners 29 and/or 35 can be at least partly rounded.

If both spokes 11 are provided with respective grooves 26, the grooves of one spoke 11 can be offset in height with respect to the grooves 26 of the other spoke 11, so as to guarantee the correct removal of the mixture from the lateral walls of the tub, or container.

According to some embodiments, the grooves 26 on the two spokes 11 can be completely offset in height with respect to each other, or slightly overlapping.

If both spokes 11 are provided with grooves 26 and 34, the grooves 26 will be disposed alternately with respect to the grooves 34 and offset in height with respect to each another, so as to guarantee a more homogeneous mixing action such as to make the mixture more creamy.

Figure 5:
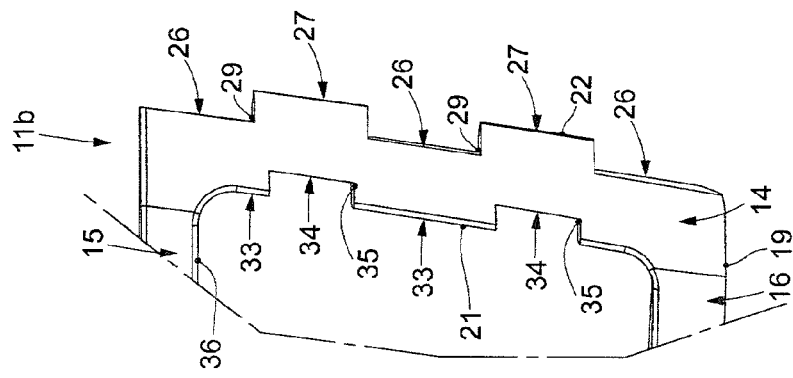
FIGS. 5 AND 6 show details respectively of the two spokes of the mixing device according to embodiments described here.
Figure 6:
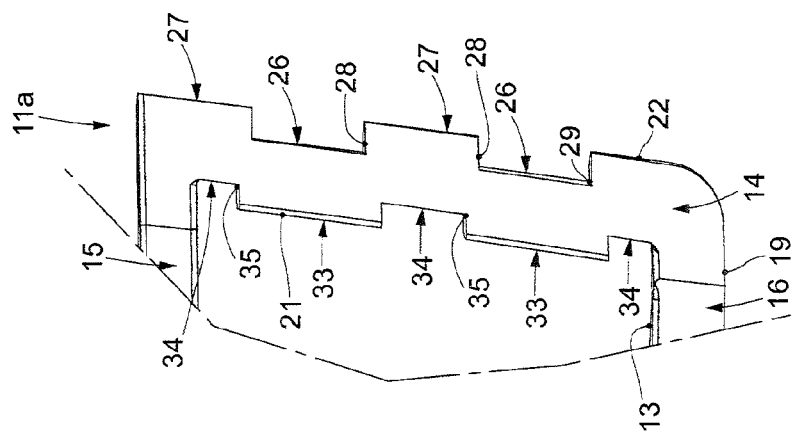

FIGS. 5 and 6 show by way of example the lateral fins 14 of respective spokes 11a, 11b of a mixing device 10 provided with respective grooves 26, 34 and extensions 27, 33.

As can be seen, the grooves 26 of the spoke 11a are offset with respect to the grooves 26 of the other spoke 11b so as to follow autonomous circumferential paths and guarantee, during use, the correct removal of the mixture from the lateral walls of the container. The grooves 34 of the spoke 11a are also disposed offset with respect to the grooves 26 of the other spoke 11b following autonomous circumferential paths so as to mix each part of the mixture in a continuous and homogeneous manner, volumizing it and making it more creamy.

Furthermore, the grooves 34 are made in correspondence with the extensions 27 so as to achieve the purposes above without having to increase the overall thickness of the lateral fins 14 and, therefore, the weight and bulk of the spokes 11.

It is clear that modifications and/or additions of parts may be made to the mixing device 10 as described heretofore, without departing from the field and scope of the present invention.

It is also clear that, although the present invention has been described with reference to some specific examples, a person of skill in the art shall certainly be able to achieve many other equivalent forms of mixing device 10, having the characteristics as set forth in the claims and hence all coming within the field of protection defined thereby.

The invention claimed is:

1. A mixing device suitable to mix substances or liquid or semi-liquid mixtures to increase the volume thereof, comprising a hub which develops along a central axis and two mixing spokes connected to the hub, wherein each of said spokes comprises an external lateral fin and two upper and lower connection segments, which connect respective upper and lower ends of said lateral fin to said hub, and wherein said lateral fins and said upper and lower connection segments have respective longitudinal axes of development inclined with respect to each other and/or with respect to said central axis, wherein said spokes are disposed angled with respect to each other by an angle of 180° with respect to said central axis and develop with respect to said central axis in a truncated cone-shaped volume, and in that said fins have respective external edges lying on a common truncated cone-shaped surface, having a flared shape between said lower connection segment and said upper connection segment, and the lateral fin of at least one spoke lies on a vertical lying plane inclined with respect to said central axis by an angle of vertical inclination comprised between 2° and 10°.

2. The mixing device as in claim 1, wherein said external edges have a flaring angle comprised between 1° and 15° with respect to the central axis.

3. The mixing device as in claim 1, wherein said external edges have a flaring angle comprised between 5° and 10° with respect to said central axis.

4. The mixing device as in claim 1, wherein each of said two spokes has a through aperture delimited by said connection segments, by said lateral fin and by said hub suitable to allow, during use, the passage of the substances or the mixture.

5. The mixing device as in claim 1, wherein the lateral fin of at least one spoke lies on a vertical lying plane inclined with respect to said central axis by an angle of vertical inclination comprised between 4° and 8°.

6. The mixing device as in claim 1, wherein said upper and lower connection segments of at least one spoke are angled with respect to each other by an angle of horizontal inclination comprised between about 15° and about 25°.

7. The mixing device as in claim 5, wherein said upper and lower connection segments of at least one spoke are angled with respect to each other by an angle of horizontal inclination comprised between about 18° and about 22°.

8. The mixing device as in claim 1, wherein at least one spoke is provided with grooves and/or extensions made in an external edge of the respective lateral fin, defining passage channels configured to promote the generation of small bubbles suitable to increase the volume of the substances and of the mixture to mix.

9. The mixing device as in claim 8, wherein at least one spoke is provided with other grooves made in an internal edge of the lateral fin so as to define extensions, said other grooves being disposed alternate with respect to the grooves and cooperating with them in order to increase the volume of the substances more effectively.

10. The mixing device as in claim 8 or 9, wherein said passage channels and said grooves have respective squared corners.

11. The mixing device as in claim 1, wherein said upper and lower connection segments are angled with respect to the respective lateral fin, defining between them respective included angles, comprised between 155° and 175°.

12. The mixing device as in claim 1, wherein at least one of either said upper or lower connection segments has a shape tapered from said hub toward said fin.

13. A machine to prepare ice-cream comprising a truncated cone-shaped container in which the ingredients are disposed, a cooling circuit to cool the container, a motor member and a mixing device as in claim 1 disposed in said container, wherein the hub is connected to a drive shaft of the motor member in order to be made to rotate around said central axis, and said lateral fins are each located at least partly in contact with the internal side walls of the container.

14. A machine as in claim 13, wherein said central axis of rotation is inclined by an angle not greater than 20° with respect to a horizontal plane.

* * * * *